United States Patent
Nakagawa et al.

[11] 3,805,747
[45] Apr. 23, 1974

[54] COMBUSTION CHAMBER DEVICE FOR A ROTARY PISTON INTERNAL COMBUSTION ENGINE

[75] Inventors: Kazuo Nakagawa, Tokyo; Junji Otani, Omiya, both of Japan

[73] Assignee: Honda Giken Kogyo Kabushiki Kaisha, Tokyo, Japan

[22] Filed: Sept. 18, 1972

[21] Appl. No.: 290,141

[30] Foreign Application Priority Data
Sept. 20, 1971 Japan.......................... 46-72510

[52] U.S. Cl. ............................... 123/8.13, 123/75 B
[51] Int. Cl. ............................................. F02b 53/08
[58] Field of Search ....... 123/8.13, 8.15, 8.45, 8.01, 123/75 B, 32 ST, 32 SP, 33 B, 33 C, 33 E

[56] References Cited
UNITED STATES PATENTS
3,508,530  4/1970  Clawson.......................... 123/8.01 X
3,406,667  10/1968  Evans et al...................... 123/32 ST FOREIGN PATENTS OR APPLICATIONS
1,022,051  1/1958  Germany........................... 123/75 B

*Primary Examiner*—Carlton R. Croyle
*Assistant Examiner*—Michael Koczo, Jr.
*Attorney, Agent, or Firm*—Eric H. Water

[57] ABSTRACT

Arrangement in a rotary piston engine of a main and an auxiliary combustion chamber communicating with each other and an air compressor connected to the auxiliary combustion chamber to serve the purpose of scavenging the latter. The arrangement gives an improved ignition characteristic while ensuring stable and economic engine operation forming clean exhaust gases.

3 Claims, 2 Drawing Figures

COMBUSTION CHAMBER DEVICE FOR A ROTARY PISTON INTERNAL COMBUSTION ENGINE

BACKGROUND AND SUMMARY OF THE INVENTION

The present invention relates generally to a rotary piston internal combustion engine and more particularly to a combustion chamber device for such engine which is designed to enable the engine to operate in a stable manner with an improved ignition characteristic enabling use of a lean fuel-air mixture for substantial reduction in amounts of harmful ingredients occurring in the engine exhaust and for economic engine operation.

Already known in the art is an engine of the torch ignition type the combustion space of which is divided into two parts including a main combustion chamber and a small auxiliary combustion chamber communicating therewith and in which combustion flame formed by ignition of the mixture in the auxiliary chamber is directed into the main combustion chamber for ignition of the relatively, lean mixture fed therein. Such arrangement is advantageous in that it gives a favorable ignition characteristic and thus enables the engine to operate efficiently with a relatively lean fuel-air mixture. However, application of such arrangement to a rotary piston engine involves a disadvantage that any satisfactory scavenging effect cannot be obtained in the auxiliary combustion chamber with high pressure exhaust gases remaining therein to preclude introduction of fresh mixture and hence only an un satisfactory fuel ignition is obtainable.

To overcome the difficulty described above, the present invention provides a device particularly designed to enable the auxiliary combustion chamber to be effectively scavenged.

BRIEF DESCRIPTION OF THE DRAWING

In the accompanying drawing.

DESCRIPTION OF THE PREFERRED EMBODIMENTS

Figure 1:
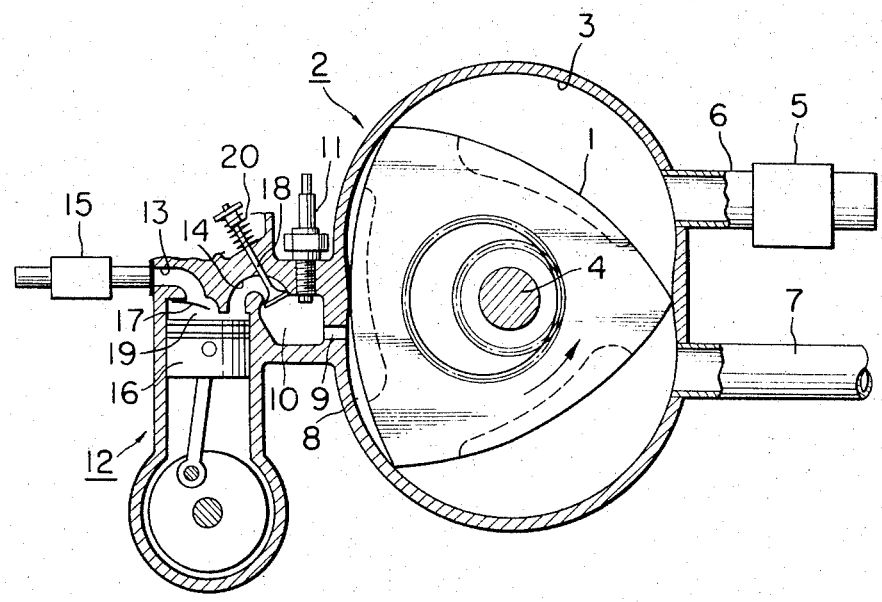
FIG. 1 is a vertical cross-sectional view of one preferred embodiment of the present invention.

Referring to the drawing and first to FIG. 1, the rotary piston engine illustrated includes a rotary piston or rotor 1 which is accommodated in the cavity 3 defined in the engine body or housing 2 for rolling engagement with a fixed gear 4 arranged in the cavity 3 axially thereof and the torque of rotor 1 is extracted through an output shaft which is connected therewith, though not shown.

As illustrated, a inlet passage 6 extending from a main carburetor 5 and an exhaust passage 7 communicating with the atmosphere open into respective chambers defined in the cavity, which are working on the compression stroke and on the exhaust stroke, respectively. It is to be understood that the carburetor 5 is so adjusted as to form a lean fuel-air mixture.

Reference numeral 8 indicates a main combustion chamber defined between the cavity wall and the rotor 1; and 10 indicates an auxiliary combustion chamber formed in the engine body 1 and communicating with the main combustion chamber 8 by way of a torch nozzle 9. As shown, the auxiliary combustion chamber 10 is provided with a spark plug 11.

Reference numeral 12 indicates a source of compressed air in the form of a reciprocating type air compressor, adapted to rotate in synchronism with the rotor 1. In communication with the working space or chamber 19 of the compressor 12 are a inlet passage 13 connected with an auxiliary carburetor 15 and a delivery passage 14 opening into the auxiliary combustion chamber 10. It is to be understood that the auxiliary carburetor 15 is so adjusted as to form a rich fuel-air mixture.

A non-return valve 17 is arranged in the inlet passage 13 at its end opening into the compressor chamber 19 and is opened on the suction or descending stroke of the piston 16 of compressor 12 for admission of the rich fuel-air mixture from the auxiliary carburetor 15 into the compressor chamber 19.

A inlet valve 18 is arranged in that end of the delivery passage 14 which opens into the auxiliary combustion chamber 10 and is normally biased to close under the resiliency of a coiled spring 20, which is so adjusted as to allow the inlet valve to open on the compression or ascending stroke of the compressor piston 16. In this manner, the rich mixture from the auxiliary carburetor 15 is forced under pressure to flow into the auxiliary combustion chamber 10.

In the engine operation, the rotor 1 is driven to rotate in the direction indicated by the arrow in FIG. 1 and, when the main combustion chamber 8 is compressed to its minimum volume, the piston 16 of compressor 12 reaches its upper dead center, the compressor 12 being driven to rotate in synchronism with the engine output shaft and hence with rotor 1. At this time, spark plug 11 is fired to ignite the rich fuel-air mixture fed into the auxiliary combustion chamber 10 and, as the pressure therein rises, the combustion flame formed in the auxiliary combustion chamber jets out through the torch nozzle 9 into the main combustion chamber 8 so that the lean fuel-air mixture previously fed into this chamber 8 in the suction phase thereof can be effectively burned. Subsequently, as the main combustion chamber 8 expands, part of the combustion product gases in the auxiliary combustion chamber 10 is discharged into the main combustion chamber 8. The rest of the combustion gases remaining in the auxiliary combustion chamber 10 can be forcefully discharged into the main combustion chamber 8 on the following compression stroke of the air compressor 12.

Figure 2:
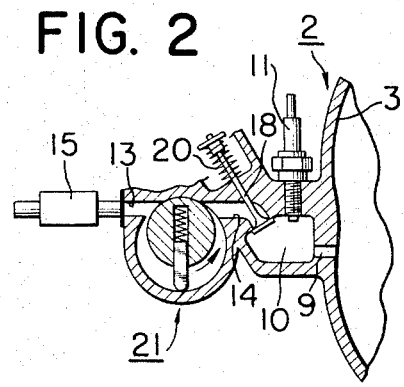
FIG. 2 is a fragmentary vertical cross-sectional view of another embodiment of the invention.

Another embodiment of the present invention illustrated in FIG. 2 employs an air compressor 21 of the rotary type instead of the reciprocating type air compressor 12 used in the embodiment shown in FIG. 1 and is substantially the same in function as the latter. Those parts corresponding to the components of FIG. 1 are identified with the same numerals.

It will be readily understood that an appropriate fuel injection nozzle can be substituted for the auxiliary carburetor 15 used in the two embodiments for formation of a rich fuel-air mixture and such fuel injection nozzle can be arranged either in the inlet passage 13 or in the auxiliary combustion chamber 10 itself.

To summarize, the combustion chamber device of the present invention includes an auxiliary combustion chamber 10 provided with a spark plug 11 and communicating with the main combustion chamber 8 of the rotary piston engine by way of a torch nozzle, and a source of compressed air supply connected with said auxiliary combustion chamber 10 by way of an inlet valve 18, which allows admission of compressed air into the auxiliary combustion chamber 10 so that any combustion gases remaining therein are effectively scavenged and in this manner the auxiliary combustion chamber 10 is filled with a fresh rich fuel-air mixture, which can be readily ignited by the sparking of spark plug 11. It will thus be appreciated that the combustion chamber device of the present invention has the advantage to improve the fuel ignition characteristic of the rotary piston engine thereby ensuring its stable operation.

Moreover, the lean fuel-air mixture fed into the main combustion chamber 8 can be effectively ignited to burn by means of the combustion flame formed in the auxiliary combustion chamber 10 even though the mixture in itself can hardly be ignited by ordinary sparking means such as spark plug 11 because of the lean fuel-air mixture. Thus, it will also be appreciated that, according to the present invention, not only formation of carbon monoxide and other harmful substances in the rotary piston engine can be effectively suppressed to make the engine exhaust clean, but also the engine can operate economically with relatively low fuel cost.

While but two embodiments of the invention have been shown and described, it is to be understood that various changes and modifications may be made herein without departing from the spirit and scope of the claimed invention.

What is claimed is:

1. In a rotary piston internal combustion engine, a combustion chamber device comprising fuel supply means; a main combustion chamber in a cavity in the engine; a rotor housed in said cavity; a torch nozzle formed in the wall of the engine cavity; an auxiliary combustion chamber communicating with said main combustion chamber by way of said torch nozzle; means for supplying a lean fuel-air mixture to said main combustion chamber and connected to said combustion chamber; means for supplying a rich fuel-air mixture to said auxiliary combustion chamber; a source of compressed fuel-air mixture supply connected to said auxiliary combustion chamber and said means for supplying a rich fuel-air mixture, said source of compressed fuel-air mixture supply being rotated in synchronism with said rotor so that when said main combustion chamber is reduced to its minimum volume, a compressed rich fuel-air mixture is supplied to said auxiliary combustion chamber; and an inlet valve between said auxiliary combustion chamber and said source of compressed fuel-air mixture supply so as to open and close fluid communication between said auxiliary combustion chamber and said source of compressed fuel-air mixture supply.

2. A device as claimed in claim 1, wherein said source of compressed fuel-air mixture supply comprises a fluid compressor through which a rich fuel-air mixture is fed into said auxiliary combustion chamber.

3. A device as defined in claim 1 wherein said auxiliary combustion chamber is forcefully scavenged by said source of compressed fuel-air mixture supply.

* * * * *